United States Patent [19]
Fusi et al.

[11] Patent Number: 5,571,551
[45] Date of Patent: Nov. 5, 1996

[54] HIGH MOLECULAR WEIGHT GALLOTANNINS AS A STAIN-INHIBITING AGENT FOR FOOD DYES

[75] Inventors: Robert W. Fusi, Stockton, N.J.; Gary H. Kestenbaum, Highland Mills; Sigmund L. Klug, Monroe, both of N.Y.

[73] Assignee: Kraft Foods, Inc., Northfield, Ill.

[21] Appl. No.: 200,797

[22] Filed: Feb. 23, 1994

Related U.S. Application Data

[63] Continuation-in-part of Ser. No. 68,361, May 27, 1993.
[51] Int. Cl.$^6$ .............................. A23L 1/27; A23L 1/275
[52] U.S. Cl. ..................... 426/540; 426/250; 426/262; 426/268
[58] Field of Search .................... 426/250, 262, 426/268, 540

[56] References Cited

U.S. PATENT DOCUMENTS

| | | | |
|---|---|---|---|
| 3,790,344 | 2/1974 | Frickenhaus et al. | 8/165 |
| 4,442,104 | 4/1984 | Wedral et al. | 426/250 |
| 4,501,591 | 2/1985 | Ucci et al. | 8/495 |
| 4,741,915 | 5/1988 | Farr et al. | 426/542 |
| 4,780,099 | 10/1988 | Greschler et al. | 8/115.6 |
| 5,096,726 | 3/1992 | Keown et al. | 426/250 |

FOREIGN PATENT DOCUMENTS

| | | |
|---|---|---|
| 0131176 | 7/1983 | European Pat. Off. . |
| 3007297 | 1/1991 | Japan . |

OTHER PUBLICATIONS

The Condensed Chemical Dictionary, 10th Ed., G. Hawley, Van Nostrand Reinhold Co., New York, 1981, p. 328.
Haslam, E. "Polyphenol–Protein Interactions" Biochemistry Journal, vol. 139 (1974), pp. 285–288.
Nishizawa, et al. "Tannins and Related Compounds. Part 5." Journal of Chemical Society Perkin Trans. I (1982), pp. 2963–2968.
21 Code of Federal Regulations Section 184.1097, "Tannic Acid" (May, 1985).
R. W. Keown and C. P. Malone, "Tannins as Stain Resists for Food Dyes" (Status Report).

*Primary Examiner*—Esther M. Kepplinger
*Assistant Examiner*—Curtis E. Sherrer
*Attorney, Agent, or Firm*—Thomas R. Savoie; Thomas A. Marcoux

[57] ABSTRACT

Selected high molecular weight gallotannins are incorporated into FD&C dye-containing foodstuffs to prevent staining of polymeric substrates such as wool or nylon rugs and clothing. Gallotannins from sumac leaves and Chinese nut galls are effective at levels of 50 ppm or below. This invention is useful in foodstuffs which are not subject to oxidation.

30 Claims, 2 Drawing Sheets

HIGH MOLECULAR WEIGHT GALLOTANNINS AS A STAIN-INHIBITING AGENT FOR FOOD DYES

This application is a continuation-in-part of Ser. No. 08/068,361 filed May 27, 1993.

BACKGROUND OF THE INVENTION

1. Field of the Invention

This invention relates to the art of inhibiting the staining action of certain dyes, such as FD&C food dyes, by means of high molecular weight gallotannins. More particularly, this invention relates to artificially-colored compositions, particularly foodstuffs, in which the colorant is a food-approved dye having an affinity for polyamides, wherein the artificially-colored composition also contains high molecular weight gallotannins in an amount effective to inhibit staining of polymers such as nylon, silk, wool, etc. Still another aspect of this invention relates to a method for formulating foodstuffs.

2. Description of the Prior Art

The consumer acceptance of several types of foodstuffs, such as beverages (e.g., fruit-flavored soft drinks), baked goods, candies, cake mixes, gelatins, puddings, and other highly processed foods) can be adversely affected by dye migration or staining. For example, if a processed foodstuff containing a dye approved for human consumption (in the U.S., these are generally the FD&C dyes) is packaged with a material containing a polyamide, and the dye migrates to and stains the polyamide, the resulting internal appearance of the food package can be too aesthetically displeasing to be sold, even though the packaged product is perfectly safe to eat. This problem is sometimes referred to as "color bleed".

Consumer acceptance of artificially-colored food products can also be adversely affected by stubborn stains produced by inadvertent spills on materials commonly found in homes, e.g., melamine-formaldehyde sheets on counter tops, polyamide fibers (particularly in wool or nylon carpets, clothes, including silk clothes, drapes, and other woven and non-woven materials), etc. Soft drinks are especially likely to stain clothes, counter tops, drapes and carpets, even though these drinks may contain only parts per million of the food-approved dye.

Various stain-blocking agents have been investigated in terms of their ability to block or inhibit the staining action of the ingestible, non-toxic dyestuffs used in processed foods. Some of these agents are referred to as "resist agents" and can contain sulfonated aromatic compounds. See, for example, U.S. Pat. No. 5,096,726 (Keown et al.), issued Mar. 17, 1992. Although these "resist agents" can be low in toxicity, they are typically synthetic compounds not having any close analogs in nature and, to date, have not been approved for food use. Accordingly, although some of these synthetic sulfonated aromatic compounds are used as stain-resist agents applied directly to fibrous materials such as carpets, they are not presently used in foods.

The mechanism by which "resist agents" or "stainblockers" or stain-inhibiting agents prevent stain is not fully understood, partly because the staining action of non-toxic dyestuffs has been studied in depth only rarely. One such study is reported in Chapter 4 ("Interactions of Food, Drug and Cosmetic Dyes with Nylon and Other Polyamides") by L. L. Oehrl et al., ACS Symposium No. 473, *Food and Packaging Interactions II*, S. J. Risch et al., Editors, American Chemical Society, 1991, pages 37 to 52. According to Oehrl et al., it is speculated that the staining action of water-soluble dyestuffs containing sulfonate groups ($-SO_3^-$) or other anionic solubilizing groups is largely an acid-base reaction which results in the formation of ionic bonding. Anionic solubilizing groups such as the $-SO_3^-$ radicals of FD&C dyes can, of course, exist in either the salt form (e.g., $-SO_3Na$) or the sulfonic acid ($-SO_3H$) form, but in acid media, one would expect the sulfonic acid form to predominate. The stainable substrate (material which becomes stained) can contain one or more nitrogen-containing sites capable of accepting a proton. For example, the stainable substrate can comprise a polymer having such protonatable sites in side chains, repeating units, or end groups, as in the case of the primary amine terminus of a polyamide or polypeptide, a pendent amine group attached to an amino acid unit or a melamine ring, or some other non-terminal group with a primary, secondary, or tertiary nitrogen atom with a moderately or strongly nucleophilic unbonded electron pair (including the $-NH-$ of a polyamide) or one or more combinations of these sites. Perhaps the most common of these sites is the primary amino group ($-NH_2$). Because the colored (stain-causing) material which comes into contact with the stainable substrate typically has a pH less than 7 and typically contains some sulfonic acid groups, transfer of a proton from an $-SO_3H$ group to an N-atom should be possible. Upon protonation of that N-atom, a cation is formed, and the cation can form an ionic bond with a sulfonate group of the water-soluble dyestuff. When the protonation is a direct transfer of the proton of a sulfonic acid group on the dyestuff molecule to a protonatable nitrogen of the stainable substrate, the staining action can be viewed as an acid-base reaction.

This theory of staining protonatable N-containing materials is supported by evidence showing that staining or dye uptake by the stainable substrate is maximized at a pH below about 4. However, dye uptake does not always increase as the pH decreases and may level off or even diminish slightly at a pH below about 1 or 2. Oehrl et al. account for the decrease in dye uptake at very low pH values by suggesting that, at these low pH values, each dyestuff molecule becomes more efficient in protonating nitrogen atoms, hence fewer dyestuff molecules are taken up by the substrate. The maximum number of dyestuff molecules taken up by the stainable substrate appears to be reached somewhere within the pH range of about 2 to about 4, which happens to encompass the $pK_a$ values of acids commonly used in foods, e.g., citric acid ($pH_a=3.13$).

Oehrl et al. explain how dye uptake by the stainable substrate can be reliably measured in experiments conducted in a manner analogous to dye bath treatments; the stainable substrate is immersed for some specified period of time (e.g., one hour) in a bath containing the dyestuff; and, after removal of the substrate, the amount of dye remaining in the bath can be measured; in extreme cases >60% — sometimes even >80% — of the dyestuff is taken up by the stainable substrate; far less than this amount of uptake will produce a visible stain.

Mildly alkaline agents are not very suitable as stain-inhibiting agents for a variety of reasons. For example, some colored materials simply cannot be marketed unless their pH is less than 7; a typical pH range for such colored materials as fruit-flavored beverages is about 2 to about 4, which is exactly in the most dangerous pH range from the standpoint of staining with typical FD&C dyes. There is a need for stain-inhibiting agents suitable for addition to foods which have very close analogs among natural materials or are themselves extracts or components of natural materials, so that, in use, a high level of safety in edible products containing same is obtained.

Some recent work by C. Paul Malone, Robert W. Keown and others at the University of Delaware has shown that a class of polyhydroxy (including dihydroxy) aromatic ring-containing compounds has an effect in inhibiting the stain-producing action of dyes and dye-containing materials on polymeric substrates which contain protonatable nitrogen sites. Compounds of the identified polyhydroxy aromatic compounds are noted as being present in extract of natural materials. Among the myriad of compounds suggested for use as stain inhibitors are naturally occurring tannin-like substances such as tannic acid. Tannic acid is also known as an acidulant and a flavor ingredient which imparts astringency to foodstuffs.

SUMMARY OF THE INVENTION

It has now been discovered that a certain class of tannic acids, the hydrolyzable gallotannins, preferably high molecular weight, hydrolyzable gallotannins, is effective at sufficiently low levels so as to make their use as anti-staining agents commercially practical. According to the present invention hydrolyzable gallotannins containing a mixture of compounds wherein at least 40% by weight, and preferably at least 50% by weight, are compounds which contain at least 8 galloyl groups (molecular weight of at least 1396) and wherein most preferably at least 85% by weight are compounds which contain at least 5 galloyl groups (molecular weight of at least 940).

The hydrolyzable gallotannins of this invention are comprised of a mixture of complex polyphenyols having a core of D-glucose to which three or more galloyl ester groups have been linked. That for purposes of this invention, it is the D-glucose based gallotannins which are useful. Quinnic acid based tannins, such as tannic acid obtained from tara pods, have not been found to be useful for purposes of this invention due to the high levels of these materials needed, as compared to their D-glucose based counterparts. Condensed (i.e., non-hydrolyzable) tannins, such as tea tannins, are also not practically useful due to the high level required.

The gallotannin material of this invention is typically a water-soluble, amorphous powder. The gallotannin material may be added to a dye-containing foodstuff in any suitable manner, such as dry-blending the gallotannin material with the foodstuff or adding a solution of the gallotannin material to the foodstuff. The gallotannin material may be employed either per se or as a component of a co-dried or dry-blended mixture. Preparing a pre-blend of the gallotannin material and food dyes may be a useful combination for addition to the foodstuff may also prove to be useful. The gallotannins employed to provide stain inhibition may also impart astringency to the foodstuff if employed at sufficiently high levels.

The hydrolyzable gallotannins are useful as anti-staining agents in foodstuffs which contain food colorants capable of staining polymeric substrates. The foodstuffs include those which are not subject to oxidation either because the foodstuff formulation does not contain a significant level of oxidizable ingredients or because the foodstuff contains as effective level of an antioxidant (not hydrolyzable gallotannins), such as butlyhydroxanisole (BHA), butlyhydrozytoluene (BHT), tocopherols, and/or tocopherol containing materials (e.g., sage or rosemary). The use of this invention in foodstuffs which are free of fat is also contemplated.

DETAILED DESCRIPTION OF THE INVENTION

Figure 1:
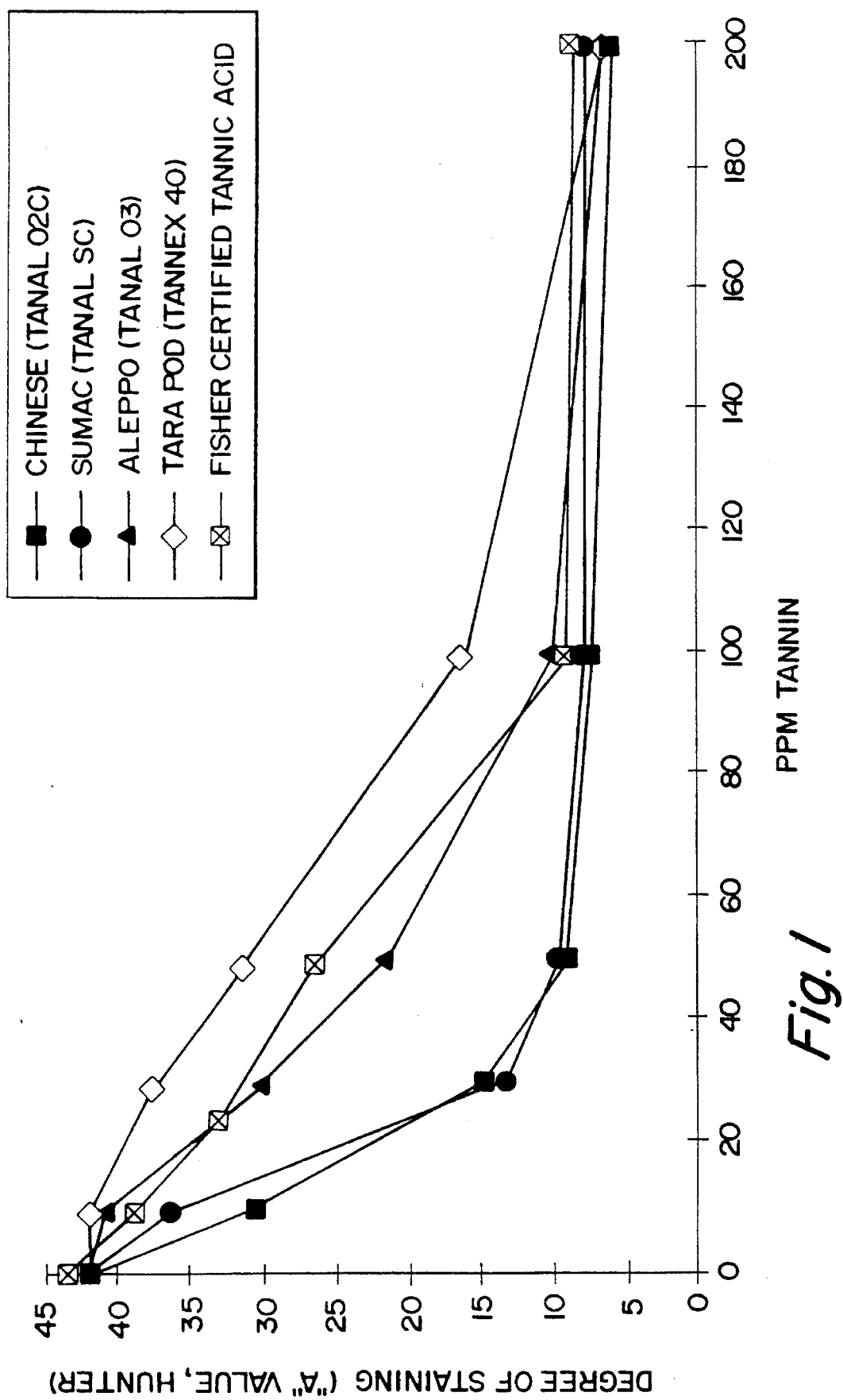
FIG. 1 is a graph showing the results of a carpet staining study of five different commercial gallotannin materials at various levels.

Among the gallotannins suitable for use in this invention are those obtained from Chinese nut gall or sumac leaves. Gallotannins can be obtained from these natural materials by known means and, are also available as materials of commerce. Sumac-derived gallotannin is available form Omnichem S. A. (Brussels, Belgium) as TANAL™ SC gallotannin and BREWTAN™ SI gallotannin. Gallotannin derived from Chinese nut gall is available from Omnichem as BREWTAN™ gallotannin C and TANAL™ 02C gallotannin and from Mallinkrodt (St. Louis, Mo.) as TANNIC 4027 gallotannin. All of these gallotannins are D-glucose based and have an average molecular weight in excess of 1000, typically between 1000 and 2000, preferably between 1200 and 1600 and most preferably between 1250 and 1500.

The chemical structure of the gallotannin compounds of this invention is depicted by the generic structure:

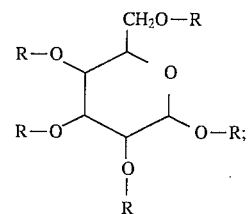

where each R=H or

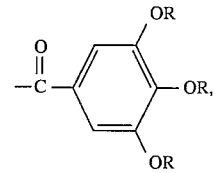

independently.

Typically from 1 to 14 galloyl groups (i.e.,

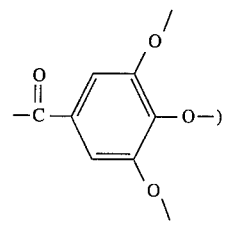

are contained in each compound. Naturally-derived gallotannin material will contain many different galloyl-glucoses in terms of both homologous and isometric compounds.

The gallotannins described for use in this invention are able to substantially or essentially eliminate staining of nylon rugs by aqueous foodstuffs containing FD&C dyes at typical food use levels. Gallotannins use levels in the foodstuff, as consumed, of 50 parts per million or below may be achieved by means of this invention. Increasing the level of the gallotannins of this invention above 50 ppm does not significantly increase the anti-staining effect. If levels of gallotannins above 50 ppm are necessary, cost considerations and regulatory restrictions make the use of such materials impractical. Thus materials such as the condensed tannins and tannic acids extracted from aleppo (i.e., Turkish nut gall) (average molecular weight about 950) or tara pods (average molecular weight about 900), which have been found to require levels in excess of 100 ppm to essentially eliminate staining of nylon rugs by aqueous foodstuffs containing FD&C dyes, are not suitable for use in this invention.

Illustrative of the gallotannins suitable for use in this invention is Chinese gallotannin derived from twig galls of *Rhus semialata L.* As reported by Niakizawa and Yamagishi in an article entitled "Tannins and Related Compounds. Part 5. Isolation and Characterization of Polygalloylglucoses from Chinese Gallotannin" found in J.Chem. Soc. Perkin Trans. I 1982 at pages 2963–68, Chinese gallotannin reportedly contains on average 8.3 galloyl groups per glucose molecule, has an average molecular weight of 1434, and has been stated as being a mixture consisting mainly of penta thru dodeca-galloylglucoses which have depside galloyl group(s) randomly distributed at the C-2, C-3 and C-4 positions on a penta-O-galloyl-β-D-glucose core. According to Niakizawa and Yamagishi, the structure of Chinese gallotannin is represented by the following formula:

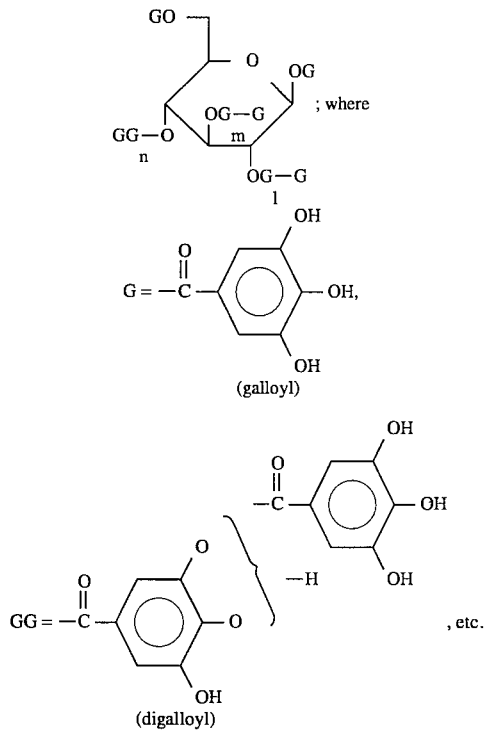

and where l+m+n= a number between 0 and 7.

The relative compositions of penta thru dodecagalloyl-glucoses in Chinese gallotannin, as analyzed by normal phase high-pressure liquid chromatography were reported to be as follows:

|  | Ratio (%) | Identified Isomers |
|---|---|---|
| Pentagalloylglucose | 4 | One |
| Hexagalloylglucose | 12 | Three |
| Heptagalloylglucose | 19 | Four |
| Octagalloylglucose | 25 | More than eight |
| Nonagalloylglucose | 20 | More than nine |
| Decagalloylglucose | 13 | More than seven |
| Undecagalloylglucose | 6 |  |
| Dodecagalloylglucose | 2 |  |

Illustrative of the colorants or dyes against which the gallotannin stain-inhibiting agents of this invention are effective are FD&C dyes such as Brilliant Blue (FD&C Blue No. 1), Indigo Disulfoacid (FD&C Blue No. 2), Fast Green FDF (FD&C Green No. 3), Erythrosine (FD&C Red No. 3), Ponceau SX (FD&C Red No. 4), Allura Red (FD&C Red No. 40), Sunset Yellow (FD&C Yellow No. 6), Tartrazine (FD&C Yellow No. 5), Orange B, and similar soluble dyes containing anionic groups.

At first glance, many of these dyes appear to have very little in common from a molecular structure standpoint. There are at least two FD&C dyes which are triarylmethanes (Blue 1 and Green 3), one indigoid (Blue 2), one xanthene (Red 3), three monoazos (Red 4, Red 40, Yellow 6), at least one pyrazolone (Yellow 5, which also has a monoazo group). Certain dyes which still carry an "FD&C" designation as a kind of shorthand identification have been "delisted" and are no longer considered safe for ingestion by humans, e.g., Orange I and Orange II. The delisted dyes are of course less preferred.

Despite fundamental differences in structure, however, all of these dyes have at least one anionic group substituted on a benzene or naphthalene ring structure, typically for the purpose of improving water solubility. The anionic group is generally the sulfonate radical ($-SO_3^-$), which can either be in salt form (e.g., $-SO_3Na$ or an internal salt form) or acid form ($-SO_3H$); most typically, the commercial form of the dye contains at least one sodium sulfonate group substituted on a benzene or naphthalene ring structure. The sulfonated benzene can be fused to a ring of the dye structure but is more typically an independent ring-directly attached to an azo group or indirectly linked to a triarylmethane structure or whatever the dye moiety happens to be.

The amount of ingestible dye needed to provide deep shades of blue, yellow, green, red, purple, orange, etc., is relatively small compared to the weight of the complete food product (e.g., the fully constituted food product, including aqueous diluent, if any) and is generally in the parts-per-million (by weight) range. Amounts less than 1000 ppm (more typically less than about 100 ppm), e.g., 1 to 50 ppm are conventionally used in processed food products. Other artificial additives include sweeteners, preservatives, and the like. The presence of these additives (or of sucrose or other sugars) appears to have no adverse effect upon the stain-inhibiting activity of the stain inhibitors used in this invention.

Particularly preferred colored food products for use with this invention are powdered materials which can become drinks when blended with water, e.g., powdered soft drinks. Other suitable food products could include liquid drinks, such as fruit juices, fruit drinks or carbonated beverages, gelatin gels or other dessert gels, puddings, jams, jellies, candies and the like.

This invention is further described but not limited in the following examples.

EXAMPLE 1

A series of rug staining studies were conducted to establish the relative efficacy of various commercial (from Omnichem) tannin materials at various levels. In each case strips of alabaster-beige commercial carpet made of nylon-6 fiber and without any stain-resist agent was immersed in a non-carbonated, cherry flavored and colored soft drink (KOOL-AID® Brand Powdered Drink Mix). The drink was prepared following package direction by combining the package contents (5.3 grams containing 100 mg of FD&C Red No. 40) with 200 grams of sucrose and sufficient water (1759 cc) to bring the total volume to two quarts (1.9 liters). The resulting drink contained a level of FD&C Red No. 40 of 51 ppm. The carpet strips were kept immersed in the drink for one hour after which each strip was rinsed in cold tap water. Before rinsing each of the strips exhibited a red appearance. After rinsing staining was evaluated by standard colorimetric techniques. The colorimeter used was THE COLOR MACHINE™ colorimeter (Bic/Gardner, Silver Springs, Md.) which was calibrated with white and black tiles, and with the fresh carpet produces a reading of one as the "A" value of the Hunter scale. The results are show in FIG. 1 as follows:

| Tannin Type | PPM Tannin | Hunter "A" Value |
|---|---|---|
| Chinese (TANAL 02C) | 0 | 42.0 |
| | 10 | 30.4 |
| | 30 | 14.7 |
| | 50 | 9.1 |
| | 100 | 7.5 |
| | 200 | 6.1 |
| Sumac (TANAL SC) | 0 | 42.0 |
| | 10 | 36.3 |
| | 30 | 13.4 |
| | 50 | 9.4 |
| | 100 | 7.7 |
| | 200 | 7.8 |
| Aleppo (TANAL 03) | 0 | 42.0 |
| | 10 | 41.0 |
| | 30 | 30.1 |
| | 50 | 21.7 |
| | 100 | 10.1 |
| | 200 | 6.6 |
| Tara Pod (TANNEX 40) | 0 | 42.0 |
| | 10 | 42.0 |
| | 30 | 37.6 |
| | 50 | 31.3 |
| | 100 | 16.3 |
| | 200 | 6.6 |

As can be established from these results sumac gallotannin with an average molecular weight of about 1380 and Chinese gallotannin with an average molecular weight about 1434 are, at the 50 ppm level, about 2.67 times as effective in inhibiting staining as the aleppo gallotannin with an average molecular weight of about 955. The tara pod tannin although comparable in molecular weight to the aleppo gallotannin (900 v. 955) was even less effective which is believed due to the fact that tara tannin is built around a quinnic acid core as opposed to a glucose core.

EXAMPLE 2

Figure 2:
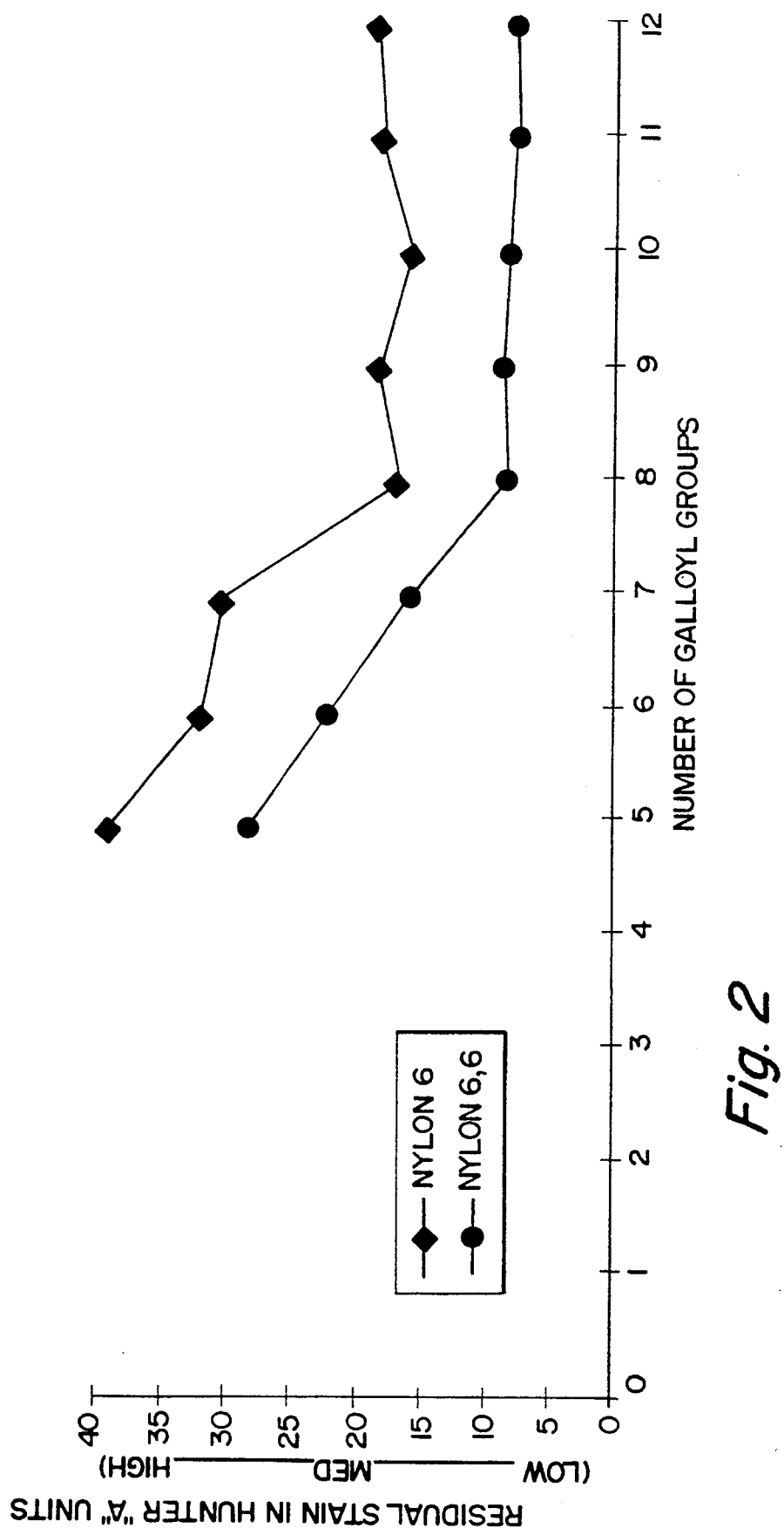
FIG. 2 is a graph showing the correlation between molecular weight of gallotannins and their stain-inhibiting properties on nylon carpet.

Additional evidence of the correlation between molecular weights of gallotannins and their stain-inhibiting properties is evidenced by FIG. 2. In this Example, purified gallotannin fractions obtained by means of HPLC column separation of commercial gallotannin material were used at a level of 25 ppm in the same fashion as the tannins of Example 1 with staining study being conducted both on carpet of nylon 6 filament and carpet of nylon 6.6 filament. FIG. 2 clearly shows that stain resistance increases as the number of galloyl groups in the gallotannin fractions increases.

EXAMPLE 3

A material designated as Tannic Acid Powder (Certified) was obtained from Fisher Scientific (Fair Lawn, N.J.). This material was evaluated for stain-inhibiting properties in the same manner as in Example 1. For levels of this material of zero, 10, 25, 50 100 and 200 ppm. the corresponding Hunter "A" values were 43.5, 38.79. 32.96, 25.47, 9.13 and 8.67. The effectiveness of this material for stain-inhibiting at 50 ppm was below that of aleppo gallotannin and above that of tara pod tannin, but significantly below that of the Chinese and sumac gallotannins which are representative of the high molecular weight gallotannins of this invention. For comparison purposes this rug staining data is also included in FIG. 1.

EXAMPLE 4

A cranberry-flavored, sucrose-free powdered soft drink mix was prepared by dry blending various food ingredients to produce the following compositions:

| Component | Weight % |
|---|---|
| Citric Acid | 48.71 |
| Natural and Artificial Flavors (fixed in carbohydrate carriers) | 22.51 |
| Malic and Tartaric Acids | 12.90 |
| Aspartame | 5.34 |
| Cranberry Juice Solids | 5.51 |
| Potassium Citrate | 1.70 |
| Gallotannins (TANAL ™ SC) | 0.51 |
| Vitamin C | 0.36 |
| Artificial Colors (Red 40 and Blue 1) | 1.24 |
| Tricalcium Phosphate | 1.22 |
| | 100.00 |

When 14.73 grams of this composition is combined with 1.89L (2 quarts) of water, a beverage is produced which, as compared to a comparable beverage without added gallotannins, greatly reduces the staining of nylon carpet.

Having thus described the invention, what is claimed is:

1. A foodstuff which is not subject to oxidation comprising:

(a) an artificial colorant which stains a polymeric substrate; and (b) an amount of gallotannins effective to inhibit staining of said polymeric substrate, said gallotannins consisting of a mixture of compounds having the formula:

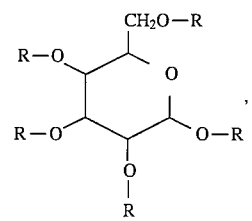

where each R=H or

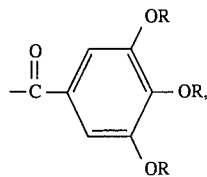

independently,
and wherein at least 40% by weight of said mixture of compounds contain at least 8 galloyl groups.

2. The foodstuff of claim 1 wherein at least 50% by weight of said compounds contain at least 8 galloyl groups.

3. The foodstuff of claim 2 wherein at least 85% of said compounds contain at least 5 galloyl groups.

4. The foodstuff of claim 1 wherein gallotannins are present at a level at or below 50 ppm, as consumed.

5. The foodstuff of claim 4 wherein the gallotannins are derived from natural materials.

6. The foodstuff of claim 5 wherein the natural material is sumac leaves or Chinese nut gall.

7. The foodstuff of claim 1 wherein the mean molecular weight of the compounds is in excess of 1000.

8. The foodstuff of claim 7 wherein the mean molecular weight is between 1000 and 2000.

9. The foodstuff of claim 8 wherein the mean molecular weight is between 1200 and 1600.

10. The foodstuff of claim 9 wherein the mean molecular weight is between 1250 and 1500.

11. The foodstuff of claim 1 wherein the foodstuff is a fruit-flavored, powdered dessert or beverage mix.

12. The foodstuff of claim 1 wherein the foodstuff is a fruit-flavored beverage having a pH of between 2 and 5.

13. The foodstuff of claim 1 wherein the colorant is selected from the group consisting of U.S. FD&C dyes Blue No. 1, Blue No. 2, Green No. 3, Red No. 3, Red. No. 4, Red No. 40, Yellow No. 6 and Yellow No. 5.

14. The foodstuff of claim 1 wherein the polymeric substrate is wool or nylon.

15. The foodstuff of claim 1 wherein the foodstuff contains an antioxidant at a level which is effective to prevent oxidation and wherein the antioxidant is not a hydrolyzable gallotannin.

16. The foodstuff of claim 1 wherein the foodstuff is free of fat.

17. A method of inhibiting the staining activity of foodstuffs which are not subject to oxidation and which contain an artificial colorant which stains a polymeric substrate by adding to said foodstuff an amount of gallotannins effective to inhibit staining of said polymeric substrate, said gallotannins consisting of a mixture compounds having the formula:

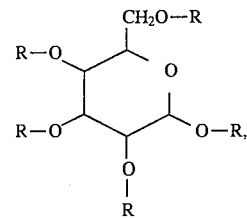

where each R=H or

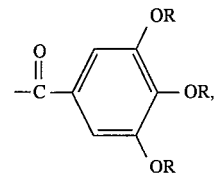

independently,
and wherein at least 40% by weight of said mixture of compounds contain at least 8 galloyl groups.

18. The method of claim 17 wherein at least 50% by weight of said compounds contain at least 8 galloyl groups.

19. The method of claim 18 wherein at least 85% of said compounds contain at least 5 galloyl groups.

20. The method of claim 17 wherein gallotannins are present at a level at or below 50 ppm, as consumed.

21. The method of claim 20 wherein gallotannins are derived from natural materials.

22. The method of claim 21 wherein the natural material is sumac leaves or Chinese nut gall.

23. The method of claim 17 wherein the mean molecular weight of the compounds is in excess of 1000.

24. The method of claim 23 wherein the mean molecular weight is between 1000 and 2000.

25. The method of claim 24 wherein the mean molecular weight is between 1200 and 1600.

26. The method of claim 25 wherein the mean molecular weight is between 1250 and 1500.

27. The method of claim 17 wherein the foodstuff is a fruit-flavored, powdered dessert or beverage mix.

28. The method of claim 17 wherein the foodstuff is a fruit-flavored beverage having a pH of between 2 and 5.

29. The method of claim 17 wherein the colorant is selected from the group consisting of U.S. FD&C dyes Blue No. 1, Blue No. 2, Green No. 3, Red No. 3, Red No. 4, Red No. 40, Yellow No. 6 and Yellow No. 5.

30. The method of claim 17 wherein the polymeric substrate is nylon or wool.

* * * * *